(12) United States Patent
Kishimoto

(10) Patent No.: US 11,803,342 B2
(45) Date of Patent: Oct. 31, 2023

(54) IMAGE INFORMATION TRANSMISSION METHOD, INFORMATION COMMUNICATION TERMINAL, AND IMAGE FORMING SYSTEM FOR DETERMINING WHEN OPERATOR IN SITE WHERE IMAGE FORMING APPARATUS BEING INSTALLED

(71) Applicant: KYOCERA Document Solutions Inc., Osaka (JP)

(72) Inventor: Mitsuyuki Kishimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/049,794

(22) Filed: Oct. 26, 2022

(65) Prior Publication Data
US 2023/0134951 A1    May 4, 2023

(30) Foreign Application Priority Data
Oct. 28, 2021  (JP) .................. 2021-176607

(51) Int. Cl.
*G06F 3/12* (2006.01)
(52) U.S. Cl.
CPC .......... *G06F 3/1285* (2013.01); *G06F 3/1203* (2013.01)
(58) Field of Classification Search
CPC .............................. G06F 3/1285; G06F 3/1203

USPC ........................................................ 358/1.15
See application file for complete search history.

(56) References Cited

U.S. PATENT DOCUMENTS

| | | | |
|---|---|---|---|
| 2004/0004735 A1* | 1/2004 | Oakeson | G06F 3/1212 358/1.14 |
| 2008/0192289 A1* | 8/2008 | Honda | G06F 3/1238 358/1.15 |
| 2016/0277602 A1* | 9/2016 | Imai | G06F 3/1207 |

FOREIGN PATENT DOCUMENTS

JP      2005-342964 A      12/2005

* cited by examiner

*Primary Examiner* — Allen H Nguyen
(74) *Attorney, Agent, or Firm* — Studebaker & Brackett PC

(57) ABSTRACT

An image information transmission method includes receiving, determining, requesting, causing, and cancelling. In the receiving, an instruction to transmit image information to an image forming apparatus is received from an information communication terminal. In the determining, information relating to a location of an operator of the information communication terminal that is stored in storage is referenced upon execution of the receiving. In the determining, whether or not the operator is in a site where the image forming apparatus is installed. In the requesting, when the operator is not in the site where the image forming apparatus is installed, the information communication terminal requests the operator to determine whether to transmit the image information to the image forming apparatus.

3 Claims, 3 Drawing Sheets

IMAGE INFORMATION TRANSMISSION METHOD, INFORMATION COMMUNICATION TERMINAL, AND IMAGE FORMING SYSTEM FOR DETERMINING WHEN OPERATOR IN SITE WHERE IMAGE FORMING APPARATUS BEING INSTALLED

INCORPORATION BY REFERENCE

The present application claims priority under 35 U.S.C. § 119 to Japanese Patent Application No. 2021-176607, filed on Oct. 28, 2021. The contents of this application are incorporated herein by reference in their entirety.

BACKGROUND

The present disclosure relates to an image information transmission method, an information communication terminal, and an image information transmission system.

An image forming apparatus receives image information to form an image on a recording medium. For example, a plurality of information communication terminals are connected to the image forming apparatus and the image forming apparatus receives image information from the information communication terminals.

Upon receiving the image information from one of the information communication terminals, a printer as an example of the image forming apparatus connected to a network performs printing only when an operator of the information communication terminal is in a site where the printer is installed. This can allow the operator to quickly collect a printed material. Therefore, high security can be ensured with low possibility of theft of printed materials.

SUMMARY

According to an aspect of the present disclosure, an image information includes: receiving from an information communication terminal an instruction to transmit image information to an image forming apparatus that forms an image on a recording medium based on the image information; determining, upon execution of the receiving, whether or not an operator operating the information communication terminal is in a site where the image forming apparatus is installed by referencing information relating to a location of the operator, the information relating to the location of the operator being stored in storage; causing, when the operator is in the site where the image forming apparatus is installed, the information communication terminal to transmit the image information to the image forming apparatus; requesting, when the operator is not in the site where the image forming apparatus is installed, the operator to determine whether to cause the information communication terminal to transmit the image information to the image forming apparatus; causing in response to determination the information communication terminal to transmit the image information to the image forming apparatus, the determination being determination made by the operator to cause the information communication terminal to transmit the image information to the image forming apparatus; and cancelling the instruction to transmit the image information to the image forming apparatus in response to determination made by the operator not to cause the information communication terminal to transmit the image information to the image forming apparatus.

According to another aspect of the present disclosure, an information communication terminal includes an instruction receiving section, a determination section, a display section, a determination receiving section, and a transmission section. The instructing receiving section receives from an operator of the information communication terminal an instruction to transmit image information to an image forming apparatus. The determination section determines, in response to the instruction to transmit the image information, whether or not the operator is in a site where the information is installed by referencing information relating to a location of the operator. The information relating to the location of the operator is stored in storage. The display section displays, when the operator is not in the site where the image forming apparatus is installed, a message prompting the operator to determine whether to transmit the image information to the image forming apparatus. The determination receiving section receives an instruction based on determination made by the operator as to whether to transmit the image information in response to the message displayed on the display section. The transmission section transmits the image information. When the determination section determines that the operator is in the site where the image forming apparatus is installed or when the determination receiving section receives from the operator determination to transmit the image information, the transmission section transmits the image information to the image forming apparatus.

According to still another aspect of the present disclosure, an image information transmission system includes an image forming apparatus, the aforementioned information communication terminal, and storage. The image forming apparatus forms an image on a recording medium based on the image information. The storage stores therein the information relating to the location of the operator. The operator operates the information communication terminal.

DETAILED DESCRIPTION

Figure 1:
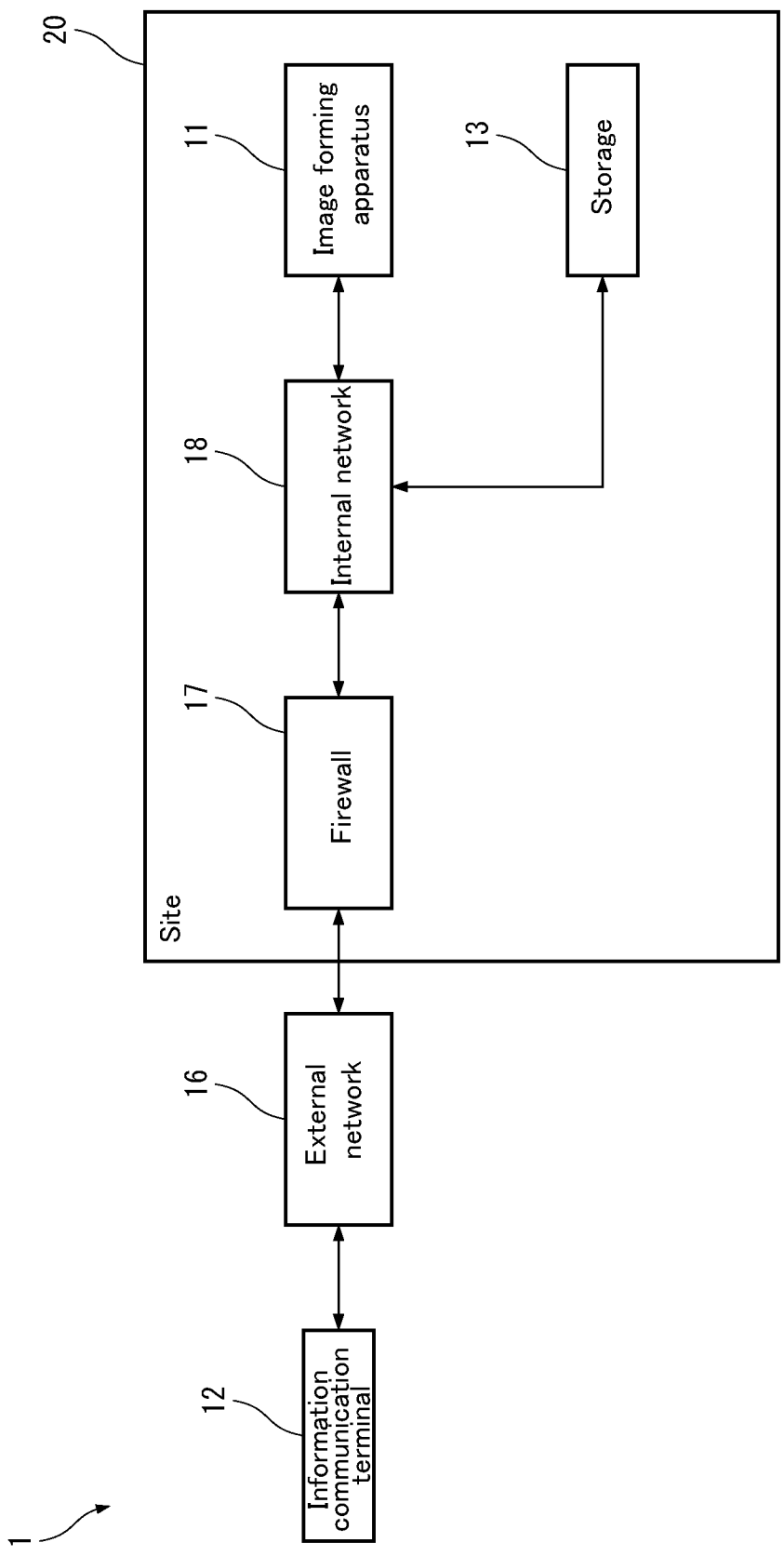
FIG. 1 illustrates an image information transmission system according to an embodiment of the present disclosure.

The following describes an image information transmission system 1 according to an embodiment of the present disclosure with reference to FIG. 1. FIG. 1 illustrates the image information transmission system 1 according to the present embodiment of the present disclosure. Note that elements, blocks, or steps that are the same or equivalent are indicated by the same reference signs in the following description. The elements, functions, and steps to which the same reference sings are assigned are the same as one another. As such, detailed description of those to which the same reference signs are assigned is not repeated.

As illustrated in FIG. 1, the image information transmission system 1 of the present disclosure includes an image forming apparatus 11 that forms an image on a recording medium based on image information, an information communication terminal 12 connected to the image forming apparatus 11 in a communicable manner, and storage 13 connected to the information communication terminal 12 in a communicable manner. In the present embodiment, communication connection between the image forming apparatus 11 and the information communication terminal 12 and communication connection between the information communication terminal 12 and the storage 13 are done via an external network 16, a firewall 17, and an internal network 18.

The image forming apparatus 11 in the present embodiment is a device that receives image information from a specific device and forms an image on a recording medium based on the received image information. Examples of the image information includes information indicating a character, information indicating a figure, and information of a combination of information indicating a character and information indicating a figure. Examples of the recording medium on which an image is to be formed by the image forming apparatus 11 include a sheet of paper, a sheet of a disk, and a sheet of a label.

The information communication terminal 12 transmits and receives information to and from another information device by an operator of the information communication terminal 12 operating the information communication terminal 12. Examples of the information communication terminal 12 include a computer and a mobile phone. Furthermore, a program for image information transmission to the image forming apparatus 11 is built in the information communication terminal 12. In the following, the operator of the information communication terminal 12 will be referred to simply as "operator". Also, the program that causes the information communication terminal 12 to transmit image information to the image forming apparatus 11 will be referred to as "image information transmission program".

The storage 13 stores therein information input to the storage 13 and transmits the stored information to another information device. The storage 13 is a part of a computer, for example. Information input to the storage 13 is done by operation on the storage 13 or reception of information from another information device. The storage 13 constitutes an access control system or a time and attendance system, for example.

The access control system refers to a system that manages presence or absence of the operator in a target room. The access control system includes for example an input device that reads information of the operator, an information processing device connected to the input device in a communicable manner, and the storage 13 connected to the information processing device in a communicable manner. Examples of the input device include a card reader, a camera, a computer, and a mobile phone. The information processing device connected to the input device in a communicable manner is a server, for example. The server is constituted by a single or plurality of computers. The information processing device determines whether or not the operator is in the target room based on information that the operator inputs to the input device. In the following, a result of determination as to whether or not the operator is in the target room may be referred to as "room information". The room information is transmitted from the information processing device to the storage 13 and input to the storage 13. That is, the operator inputs the room information to the storage 13 via the input device and the information processing device. The room information input to the storage 13 is stored in the storage 13. Note that although the above describes that the information processing device and the storage 13 are independently of each other, the storage 13 may be a part of the information processing device as long as information communication can be done between the information processing device and the storage 13.

The time and attendance system refers to a system that manages presence or absence of the operator in a target office. The time and attendance system includes for example an input device, an information processing device connected to the input device in a communicable manner, and the storage 13 connected to the information processing device in a communicable manner. The information processing device determines whether or not the operator is working in the target office based on information input to the input device. In the following, a result of determination as to whether or not the operator is working in the target office may be referred to as "attendance information". The attendance information is transmitted from the information processing device to the storage 13 and input to the storage 13. That is, the operator inputs the attendance information to the storage 13 via the input device and the information processing device. The attendance information input to the storage 13 is stored in the storage 13.

The external network 16 connected to the information communication terminal 12 is a communication network that transmits information transmitted by the information communication terminal 12 using for example electric signals. Here, the communication network refers to a network to which a plurality of information devices including information devices including the information communication terminal 12 are connected in a communicable manner using for example electric signals. Connection among the information devices via the network may be wired connection or wireless connection. The external network 16 is connected to the internal network 18 via the firewall 17, for example. The firewall 17 is an information device with software embedded therein for monitoring transmitted information and screening out unfavorable information. The information screened out as unfavorable information is blocked by the firewall 17 and is not transmitted to the internal network 18. The image forming apparatus 11 and the storage 13 are connected to the internal network 18.

The storage 13, the firewall 17, and the internal network 18 are installed in a site 20 where the image forming apparatus 11 is installed. Here, the site 20 where the image forming apparatus 11 is installed refers to a region within which the operator can receive a recording medium (printed material) with an image formed thereon that the operator has caused the image forming apparatus 11 to form. Examples of the site 20 include a room, the inside of a building, and the interior of the premises at a business location.

Figure 2:
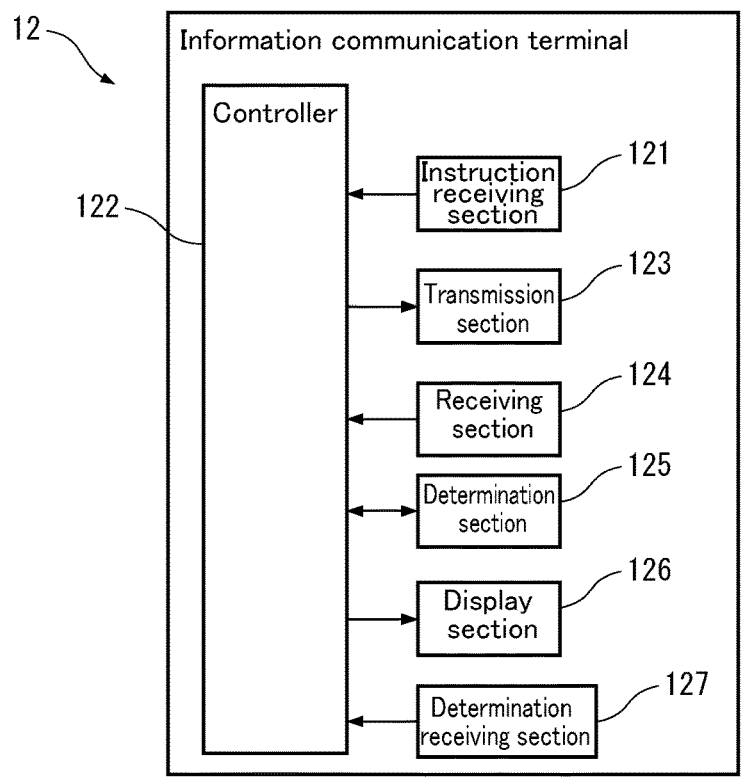
FIG. 2 illustrates an information communication terminal according to the embodiment of the present disclosure.

The information communication terminal 12 of the present disclosure will be described next with reference to FIG. 2. FIG. 2 illustrates the information communication terminal 12 according to the embodiment of the present disclosure.

As illustrated in FIG. 2, the information communication terminal 12 includes an instruction receiving section 121, a controller 122 in which the image information transmission program is embedded, a transmission section 123, a receiving section 124, a determination section 125, a display section 126, and a determination receiving section 127.

The instruction receiving section 121 and the determination receiving section 127 receive an instruction from the operator of the information communication terminal 12 and output an operation signal indicating the instruction by the operator to the controller 122. Examples of the instruction receiving section 121 include a keyboard, a mouse, a touch screen display provided in the information communication terminal 12.

The controller 122 controls the transmission section 123, the determination section 125, and the display section 126 based on the instruction that the instruction receiving section 121 receives from the operator. For example, the controller 122 includes a combination of memory and a processor such as a central processing unit (CPU). The memory includes a main storage device such as semiconductor memory and an auxiliary storage device such as semiconductor memory, a solid state drive, or a hard disk drive, for example. The image information transmission program is stored in the memory. The CPU reads out the image information transmission program stored in the memory and executes processing described in the image information transmission program.

The transmission section 123 requests information relating to the operator location from the storage 13 connected to the information communication terminal 12 in a communicable manner. The information relating to the operator location include room information or attendance information, for example. The storage 13 transmits the information relating to the operator location stored in the storage 13 to the information communication terminal 12 in response to the request from the information communication terminal 12. The receiving section 124 receives the information relating to the operator location transmitted from the storage 13. The transmission section 123 also transmits the image information to the image forming apparatus 11. The transmission section 123 and the receiving section 124 constitute a communication unit including a network interface controller (NIC) that performs communication in accordance with a specific communication protocol, for example. An example of the specific communication protocol is a transmission control protocol/internet protocol (TCP/IP).

The determination section 125 performs information processing based on the information relating to the operator location received from the storage 13 under control of the controller 122. The determination section 125 includes a combination of a CPU and memory, for example. The memory includes a main storage device such as semiconductor memory and an auxiliary storage device such as semiconductor memory, a solid state drive, or a hard disk drive, for example. The memory stores therein a "determination program" that is a computer program for executing determination as to whether or not the operator is in the site 20 where the image forming apparatus 11 is installed based on the information relating to the operator location received from the storage 13. The CPU reads out the determination program stored in the memory and executes processing described in the determination program. Note that the determination program may be a part of the image information transmission program.

The display section 126 displays under control of the controller 122 a message that prompts the operator to input an instruction. The display section 126 includes a display or a speaker provided in the information communication terminal 12. For example, where the display section 126 is a display, the display displays a message that prompts the operator to input an instruction and that is in a language which the operator can understand.

Figure 3:
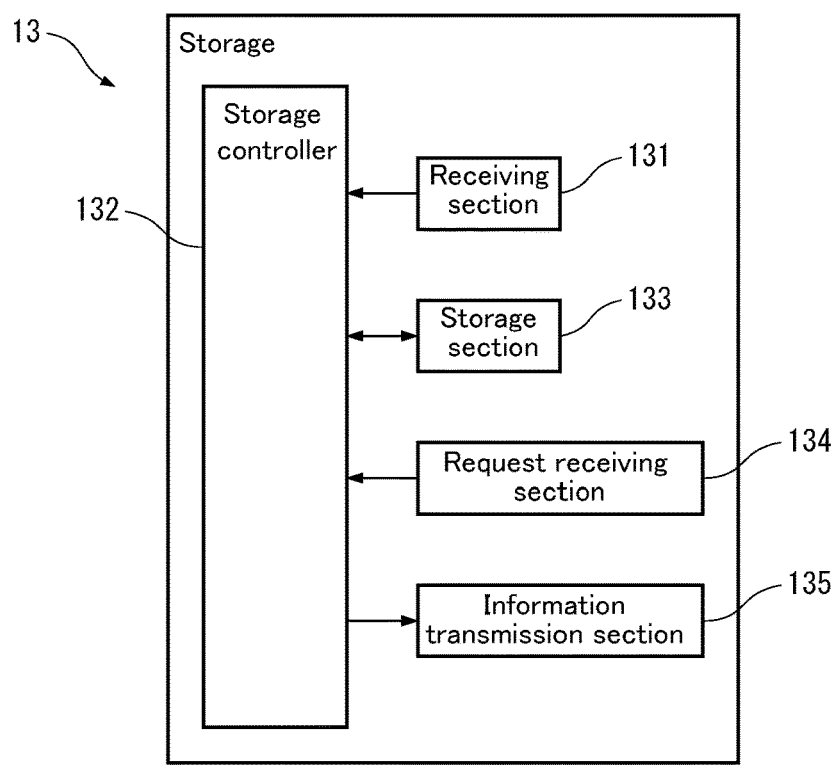
FIG. 3 illustrates storage according to the embodiment of the present disclosure.

The storage 13 of the present disclosure will be described next with reference to FIG. 3. FIG. 3 illustrates the storage 13 according to the present disclosure.

The storage 13 of the present disclosure includes a receiving section 131, a storage controller 132, a storage section 133, a request receiving section 134, and an information transmission section 135.

The receiving section 131 is a section to which the information relating to the operator location is input. The information relating to the operator location includes the room information or the attendance information. The receiving section 131 includes a communication device, for example, and receives the room information or the attendance information from the information processing device.

The storage controller 132 controls the storage section 133 and the information transmission section 135. The storage controller 132 includes a combination of memory and a processor such as a CPU, for example. The memory includes a main storage device such as semiconductor memory and an auxiliary storage device such as semiconductor memory, a solid state drive, or a hard disk drive. The CPU reads out a computer program stored in the memory and executes processing described in the computer program.

The storage section 133 stores therein the information relating to the operator location input to the receiving section 131. Examples of the storage section 133 include semiconductor memory, a solid state drive, and a hard disk drive.

The request receiving section 134 receives a request from the information communication terminal 12. By contrast, the information transmission section 135 transmits the information relating to the operator location to the information communication terminal 12 in response to the request from the information communication terminal 12. The request receiving section 134 and the information transmission section 135 constitute a communication unit including a NIC that performs communication in accordance with a specific communication protocol, for example. The specific communication protocol is a TCP/IP, for example.

Figure 4:
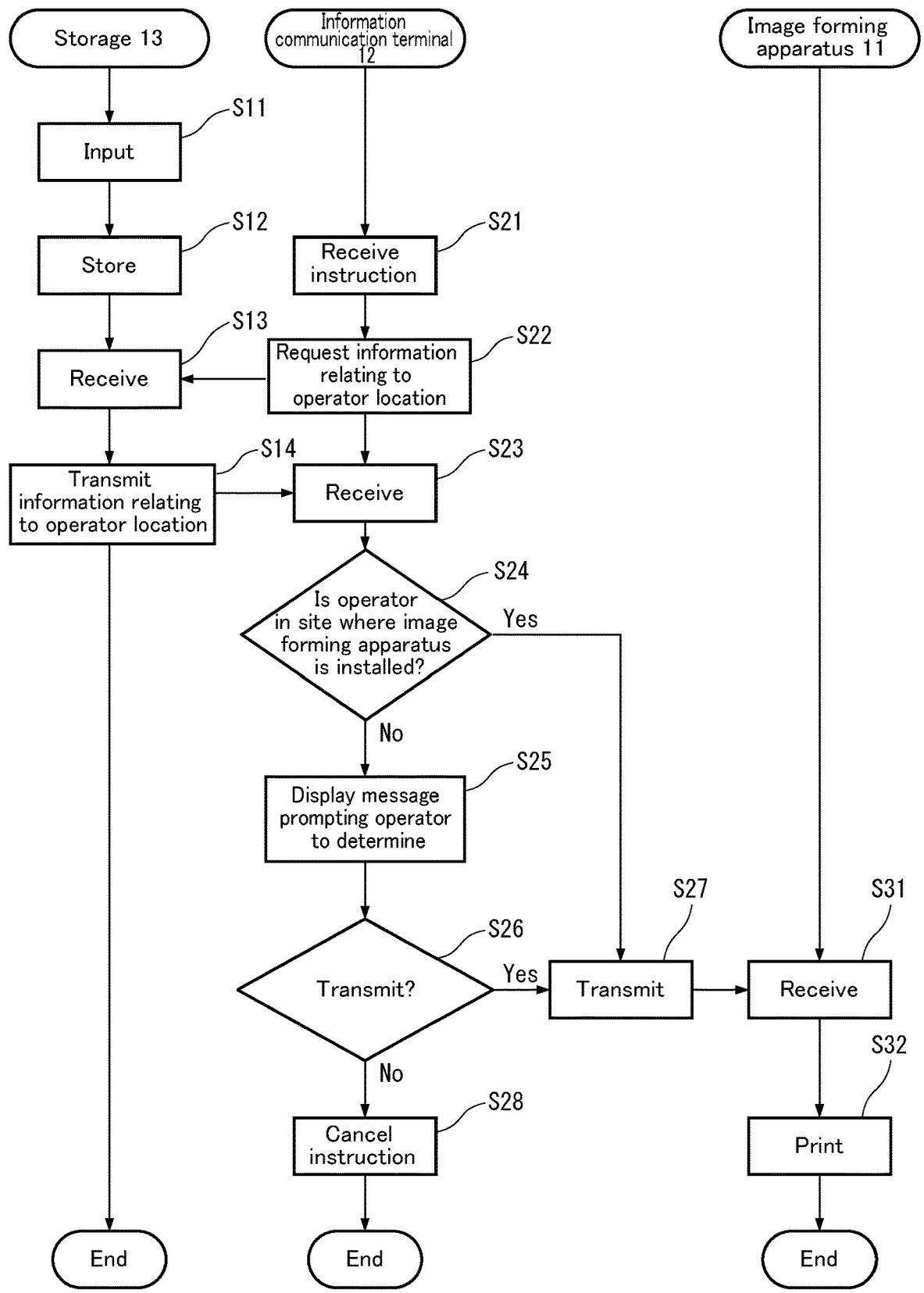
FIG. 4 is a flowchart depicting processing performed by the image information transmission system according to the embodiment of the present disclosure.

Processing by the image information transmission system 1 of the present disclosure will be descried next with reference to FIGS. 1 to 4. FIG. 4 is a flowchart depicting the processing by the image information transmission system 1 according to the embodiment of the present disclosure.

As depicted in FIG. 4, processing by the storage 13 includes Steps S11 to S14. Processing by the information communication terminal 12 includes Steps S21 to S28.

In Step S11, the operator inputs the information relating to the operator location to the receiving section 131 of the storage 13 via the information communication terminal 12.

Next in Step S12, the storage controller 132 controls the storage section 133 to store the information relating to the operator location.

By contrast, the instruction receiving section 121 of the information communication terminal 12 receives from the operator an instruction to transmit image information to the image forming apparatus 11 in Step 21. The instruction receiving section 121 outputs an operation signal to the controller 122. Note that Step S21 corresponds to an example of "receiving".

Next in step S22, the controller 122 that has received the operation signal from the instruction receiving section 121 controls the transmission section 123 to request the storage 13 to transmit the information relating to the operator location. The transmission section 123 requests the storage 13 to transmit the information relating to the operator location.

Next in step S13, the storage controller 132 of the storage 13 receives the request for the information relating to the operator location from the information communication terminal 12 via the request receiving section 134.

Next in Step S14, the storage controller 132 reads out the information relating to the operator location from the storage section 133 in response to the request for the information relating to the operator location. The storage controller 132 controls the information transmission section 135 to transmit the information relating to the operator location to the information communication terminal 12. The information transmission section 135 transmits the information relating to the operator location to the information communication terminal 12.

Next in step S23, the controller 122 of the information communication terminal 12 receives the information relating to the operator location from the storage 13 via the receiving section 124.

Next in Step S24, the controller 122 causes the determination section 125 to determine whether or not the operator is in the site 20 where the image forming apparatus 11 is installed based on the information relating to the operator location. If a negative determination is made in Step S24 (No in Step S24), the routine proceeds to Step S25. Note that Step S24 corresponds to an example of "determining".

Next in Step S25, the controller 122 controls the display section 126 to display a message prompting the operator to determine whether to transmit the image information to the image forming apparatus 11. The display section 126 displays the massage prompting the operator to determine to transmit or not to transmit the image information to the image forming apparatus 11.

Next in Step S26, the operator determines whether to transmit the image information to the image forming apparatus 11. Upon receipt of determination by the operator, the determination receiving section 127 outputs an operation signal according to the determination to the controller 122. If the operator determines to transmit the image information to the image forming apparatus 11 (Yes in Step 26), the routine proceeds to Step S27. Note that Step S26 corresponds to an example of "requesting".

If an affirmative determination is made in Step S24 by contrast (Yes in Step S24), the routine proceeds to Step S27.

In step S27, the controller 122 controls the transmission section 123 to transmit the image information to the image forming apparatus 11. The transmission section 123 transmits the image information to the image forming apparatus 11. Note that Step S27 corresponds to an example of "causing" and "causing in response to determination".

Next in Step S31, the image forming apparatus 11 receives the image information from the information communication terminal 12.

Next in Step S32, the image forming apparatus 11 forms an image on a recording medium base on the received image information.

If a negative determination as to transmission of the image information to the image forming apparatus 11 is made in Step S26 (No in Step S26) by contrast, the processing proceeds to Step S28.

In Step S28, the controller 122 cancels the instruction to transmit the image information to the image forming apparatus 11. Note that Step S28 corresponds to an example of "cancelling".

As described above with reference to FIG. 4, the information communication terminal 12 transmits the image information to the image forming apparatus 11 in the image information transmission system 1 in a situation in which the operator is in the site 20 where the image forming apparatus 11 is installed (Yes in Step S24). As such, only when the operator is in the site 20 where the image forming apparatus 11 is installed, the image forming apparatus 11 forms an image on a recording medium based on the image information. Therefore, the operator can collect the recording medium with the image formed thereon without a long time after the image has been formed on the recording medium. As a result, high security can be ensured with low possibility of theft of printed materials. Furthermore, even in a situation in which the operator is not in the site 20 where the image forming apparatus 11 is installed (No in Step S24), the information communication terminal 12 can transmit the image information to the image forming apparatus 11 when the operator determines to transmit the image information to the image forming apparatus 11 (Yes in Step S26). Therefore, convenience for the operator is increased as compared with a case in which the image information is not transmitted to the image forming apparatus 11 in a situation in which the operator is not in the room in which the image forming apparatus 11 is installed.

An embodiment of the present disclosure has been described so far with reference to the drawings. However, the present disclosure is not limited to the above embodiment and can be implemented in various forms within a scope not departing from the gist thereof. In the embodiment of the present disclosure, the storage 13, the firewall 17, and the internal network 18 are installed in the site 20. However, the storage 13, the firewall 17, and the internal network 18 may be installed in a site other than the site 20.

The image forming apparatus 11 and the storage 13 is connected to the information communication terminal 12 via the external network 16, the firewall 17, and the internal network 18 in the present disclosure. However, connection between the information communication terminal 12 and the image forming apparatus 11 may be any connection as long as the information communication terminal 12 and the image forming apparatus 11 are connected to each other in a communicable manner. For example, the information communication terminal 12 and the image forming apparatus 11 may be connected to each other not via the firewall 17. That is, they may be connected to each other via a communication network in which the internal network 18 and the external network 16 are not defined by the firewall 17 as a boundary to be distinguishable.

What is claimed is:

1. An image information transmission method comprising:

receiving from an information communication terminal an instruction to transmit image information to an image forming apparatus that forms an image on a recording medium based on the image information;

determining, upon execution of the receiving, whether or not an operator operating the information communication terminal is in a site where the image forming apparatus is installed by referencing information relating to a location of the operator, the information relating to the location of the operator being stored in storage;

causing, when the operator is in the site where the image forming apparatus is installed, the information communication terminal to transmit the image information to the image forming apparatus;

requesting, when the operator is not in the site where the image forming apparatus is installed, the operator to determine whether to cause the information communication terminal to transmit the image information to the image forming apparatus;

causing in response to determination the information communication terminal to transmit the image information to the image forming apparatus, the determination being determination made by the operator to cause the information communication terminal to transmit the image information to the image forming apparatus; and cancelling the instruction to transmit the image information to the image forming apparatus in response to determination made by the operator not to cause the information communication terminal to transmit the image information to the image forming apparatus.

2. An information communication terminal comprising:

an instruction receiving section that receives from an operator of the information communication terminal an instruction to transmit image information to an image forming apparatus;

a determination section that determines, in response to the instruction to transmit the image information, whether or not the operator is in a site where the image forming apparatus is installed by referencing information relating to a location of the operator, the information relating to the location of the operator being stored in storage;

a display section that displays, when the operator is not in the site where the image forming apparatus is installed, a message prompting the operator to determine whether to transmit the image information to the image forming apparatus;

a determination receiving section that receives an instruction based on determination, the determination being determination made by the operator as to whether to transmit the image information in response to the message displayed on the display section; and a transmission section that transmits the image information, wherein when the determination section determines that the operator is in the site where the image forming apparatus is installed or when the determination receiving section receives from the operator determination to transmit the image information, the transmission section transmits the image information to the image forming apparatus.

3. An image information transmission system comprising:

the information communication terminal according to claim 2;

an image forming apparatus that forms an image on a recording medium based on the image information; and storage that stores therein the information relating to the location of the operator.

\* \* \* \* \*